United States Patent [19]
Raleigh et al.

[11] 3,964,272
[45] June 22, 1976

[54] AIR CONDITIONING MOUNTING SYSTEM FOR A MOBILE HOME

[75] Inventors: Edward Raleigh, Fern Creek; Bruce L. Ruark, Louisville, both of Ky.

[73] Assignee: General Electric Company, Louisville, Ky.

[22] Filed: Mar. 20, 1975

[21] Appl. No.: 560,504

[52] U.S. Cl. ............................. 62/239; 62/237; 62/259; 62/298; 62/448; 296/28 R
[51] Int. Cl.² ................................. B60H 3/04
[58] Field of Search ............ 62/77, 237, 239, 259, 62/262, 298, 448, 449, 450; 248/249; 296/28 R

[56] References Cited
UNITED STATES PATENTS

| | | | |
|---|---|---|---|
| 2,525,869 | 10/1950 | Corhanidis | 62/129 |
| 2,914,927 | 12/1959 | Corhanidis | 62/237 |
| 3,206,943 | 9/1965 | Rice et al | 62/302 |
| 3,254,914 | 6/1966 | Steck | 296/28 R |
| 3,453,839 | 7/1969 | Sabin | 62/237 |
| 3,566,614 | 3/1971 | Imral | 62/262 |
| 3,712,078 | 1/1973 | Maynard et al | 62/448 |
| 3,792,895 | 2/1974 | Paulson | 296/28 R |

*Primary Examiner*—William F. O'Dea
*Assistant Examiner*—Larry I. Schwartz
*Attorney, Agent, or Firm*—Frank P. Giacalone; Francis H. Boos

[57] ABSTRACT

The present invention provides an air conditioning system for use in a mobile home. The system includes securing a mounting means to the support structure of the mobile home and an air conditioning unit that is adapted to be removably secured to the mounting means. When installed on the mounting means, the air conditioning unit is aligned to deliver conditioned air into the interior of the mobile home through its built-in air distribution system.

8 Claims, 9 Drawing Figures

AIR CONDITIONING MOUNTING SYSTEM FOR A MOBILE HOME

FIELD OF THE INVENTION

The present invention relates to an air conditioning system to be used in a mobile home and more particularly to an air conditioning unit that is adapted to deliver air to the interior of the mobile home through its own built-in air distribution system. Provision is made during construction of the mobile home to accommodate a mounting or adaptor means that is located in the support structure of the mobile home and arranged to communicate with the air distribution system of the mobile home. When properly located in the mounting means, the air delivery outlet of the air conditioning unit is aligned to deliver air to the air distribution system of the mobile home.

The air conditioning unit when used is removably secured to the mounting means with its air outlet and inlet openings positioned to deliver air into the mobile home air distribution system.

DESCRIPTION OF THE PRIOR ART

Traditionally, air conditioning units when used mobile homes require the use of cumbersome, flexible duct work to connect the unit into the air distribution system of the mobile home. In many installations, the exposed flexible duct work would be installed in a manner that would be considered unsightly, but more importantly, they are delicate and are therefore susceptible to physical damage.

U.S. Pat. No. 3,566,614-Imral provides a low-profile air conditioning unit that may be positioned under the mobile home. However, when the air conditioning unit, as taught in the above patent, is placed under the mobile home, the unit must then be connected into the mobile home air distribution system, which is an additional expense in both material and labor. Furthermore, the unit must still be connected by either the customary light-weight, delicate, flexible ducting or the more expensive rigid, sheet-metal ducting which when used would have to be fabricated and dimensioned for each installation requirements.

U.S. Pat. No. 3,712,078-Maynard provides a refrigeration unit including two covers, one solid and the other having a plurality of openings that are adapted to be used as inlet and outlet openings for circulating air from a removably mounted refrigeration unit into a refrigerator cabinet. The covers are dimensioned to be interchangeably secured to the bottom or top of the refrigeration unit, so that it may be positioned to supply refrigerated air upwardly when it is located in the bottom of the cabinet or downwardly when it is located above the cabinet.

U.S. Pat. No. 3,206,943-Rice et al shows a refrigeration unit arranged or adapted to be removably positioned in the bottom of a refrigerator cabinet. The refrigeration unit package is provided with rollers that cooperatively engage a track positioned on the cabinet wall that permits locating the refrigeration inlet and outlet openings into proper alignment with appropriate air distribution flues in the refrigerator cabinet.

While both of the above-mentioned U.S. Pat. Nos. 3,712,078 and 3,206,943 provide removably arranged refrigeration units relative to refrigeration cabinets, it should be noted, however, that the combination of both cabinet and refrigeration unit are necessary to provide a functional product. In the present invention, an air conditioning unit is provided that is adapted to be installed in a mobile home, that is a completely self-contained and usable product independent of the air conditioning unit which may be provided as an accessory.

U.S. Pat. No. 2,525,869-Corhanidis discloses a refrigeration system that is removably mounted on a railroad car. The refrigeration unit is received in rails that are mounted on a frame that in turn is inserted into the floor of the chamber to be cooled. The frame has inlet and outlet ports formed therein. The chamber to be cooled may be provided with a conduit for receiving and distributing the cooled air. The above patent does not show nor teach the provision of a mounting means that can be used with a distribution system in a mobile home which may include a plurality of zones partitioned or isolated from each other. The use of the system disclosed in U.S. Pat. No. 2,525,869 in conjunction with a mobile home would require a frame for each zone to be air conditioned.

The construction of the mobile home support structures relative to the partitions separating the zones together with the various sizes of the zones would make the system disclosed in the above cited patents impractical.

The present invention provides an adaptor plate installed in the mobile home during its construction and, optionally, at some later or subsequent time, an air conditioning unit that is adapted to be removably received in the adaptor means may be supplied and installed in the adaptor plate in alignment and cooperation with the air distribution system of the mobile home.

SUMMARY OF THE INVENTION

By this invention there is provided an air conditioning system including a mobile home having at least one zone to be air conditioned supported on a base structure. An air conditioner including air delivery and air return outlets and having guide members on the cabinet side walls is adapted to be removably attached to the mobile home.

An air distribution system associated with the base structure of the mobile home includes an air inlet for receiving air from the air conditioner and an air outlet for delivering air into the mobile home zone.

Mounting means attached to the base structure of the mobile home includes support members formed thereon for removably receiving the guide members.

Air communicating means are provided for connecting the air conditioning air delivery outlet with the air distribution system air inlet and the interior of the mobile home with the air conditioner air inlet for circulating conditioned air through the mobile home interior.

Means interacting between the guide member and support member are effective in locating the air conditioner in intimate contact with the mounting means and aligning the air conditioner air delivery outlet and inlet with openings in the mounting means.

DESCRIPTION OF THE PREFERRED EMBODIMENT

Figure 1:
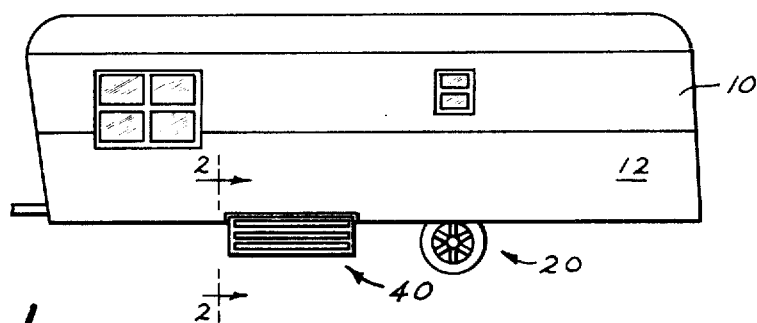
FIG. 1 is a side elevational view of a typical mobile home adapted with the present system.
Figure 2:
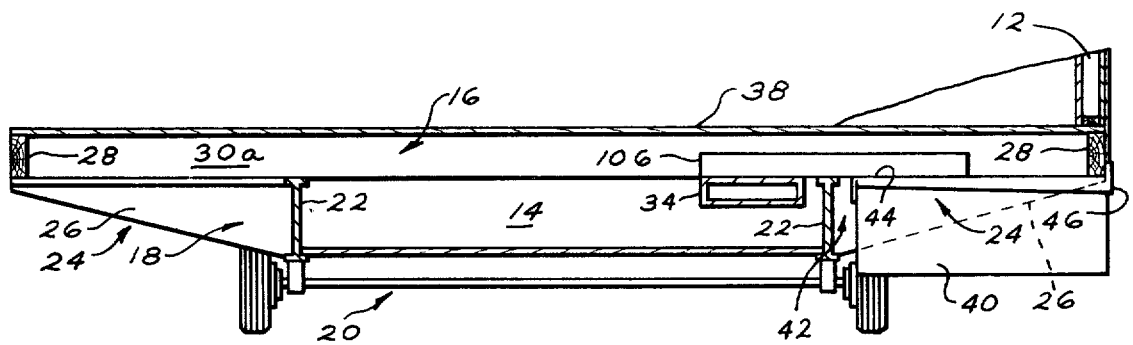
FIG. 2 is a sectional view taken along lines 2—2 of FIG. 1.

Referring now to FIGS. 1 and 2 of the drawings, a mobile home 10 having side walls 12 is supported on a base structure 14. The base structure 14 includes a floor section 16 mounted on or carried on a support frame 18 which may be mounted on a wheel assembly 20 for transporting the mobile home from one location to another.

While the base structure 14 configurations may vary with manufacturers of mobile homes, two basic and accepted forms used by manufacturers of mobile homes will herein be described in conjunction with the present invention. The support frame 18 usually includes parallel spaced main support I-beams or members 22 arranged longitudinally with respect to the mobile home 10. The beams 22 are spaced or located inwardly from the outer side walls 12 of the mobile home 10 to provide a support area 24 along both longitudinally disposed side walls 12. In order to provide adequate support for the entire width of the mobile home 10 including the support area portion 24 between the beam 22 and side walls 12, side support members 26 are spaced longitudinally and are secured to the beams 22. The side support members 26 project laterally outwardly so that the free ends are adjacent the outer edge of side walls 12 and support side beams 28 located directly under the outer walls 12.

Figure 3:
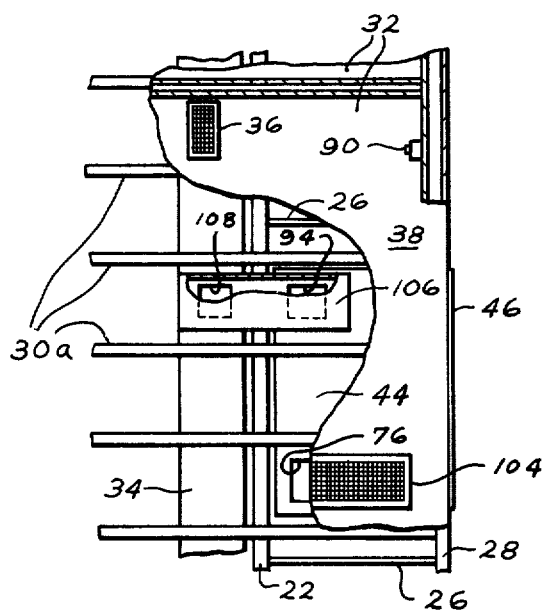
FIG. 3 is a partial plan view of the construction of FIG. 2 with parts broken away.
Figure 4:
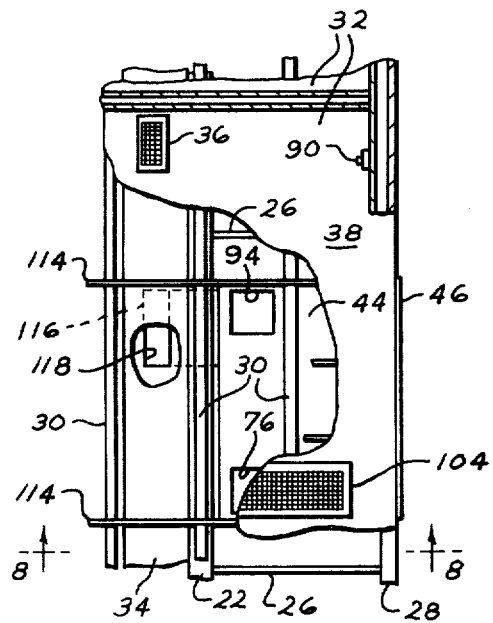
FIG. 4 is a partial plan view similar to FIG. 3 showing another mobile home floor configuration.
Figure 5:
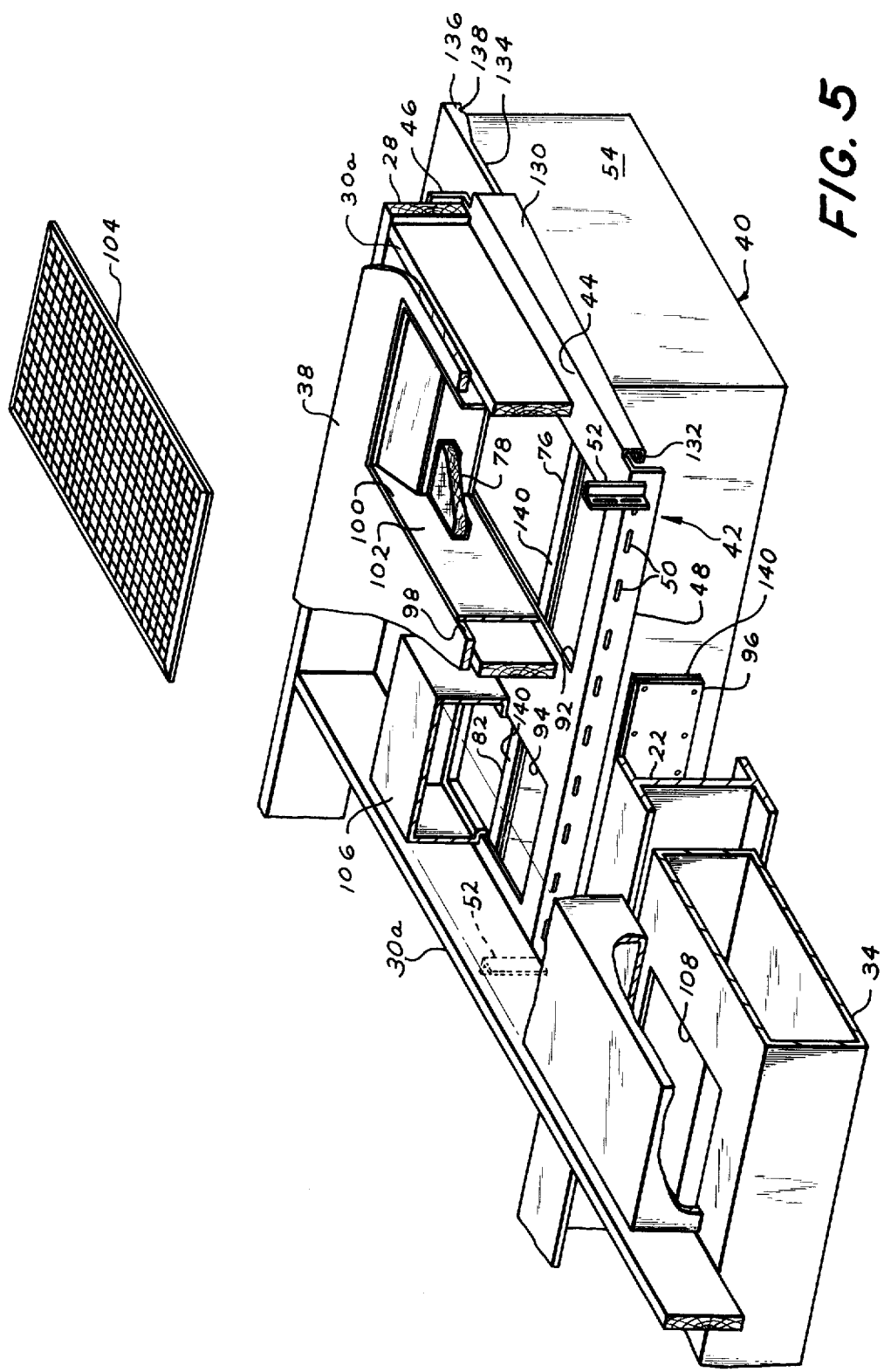
FIG. 5 is an exploded perspective view showing the mobile home base structure of FIGS. 2 and 3.
Figure 6:
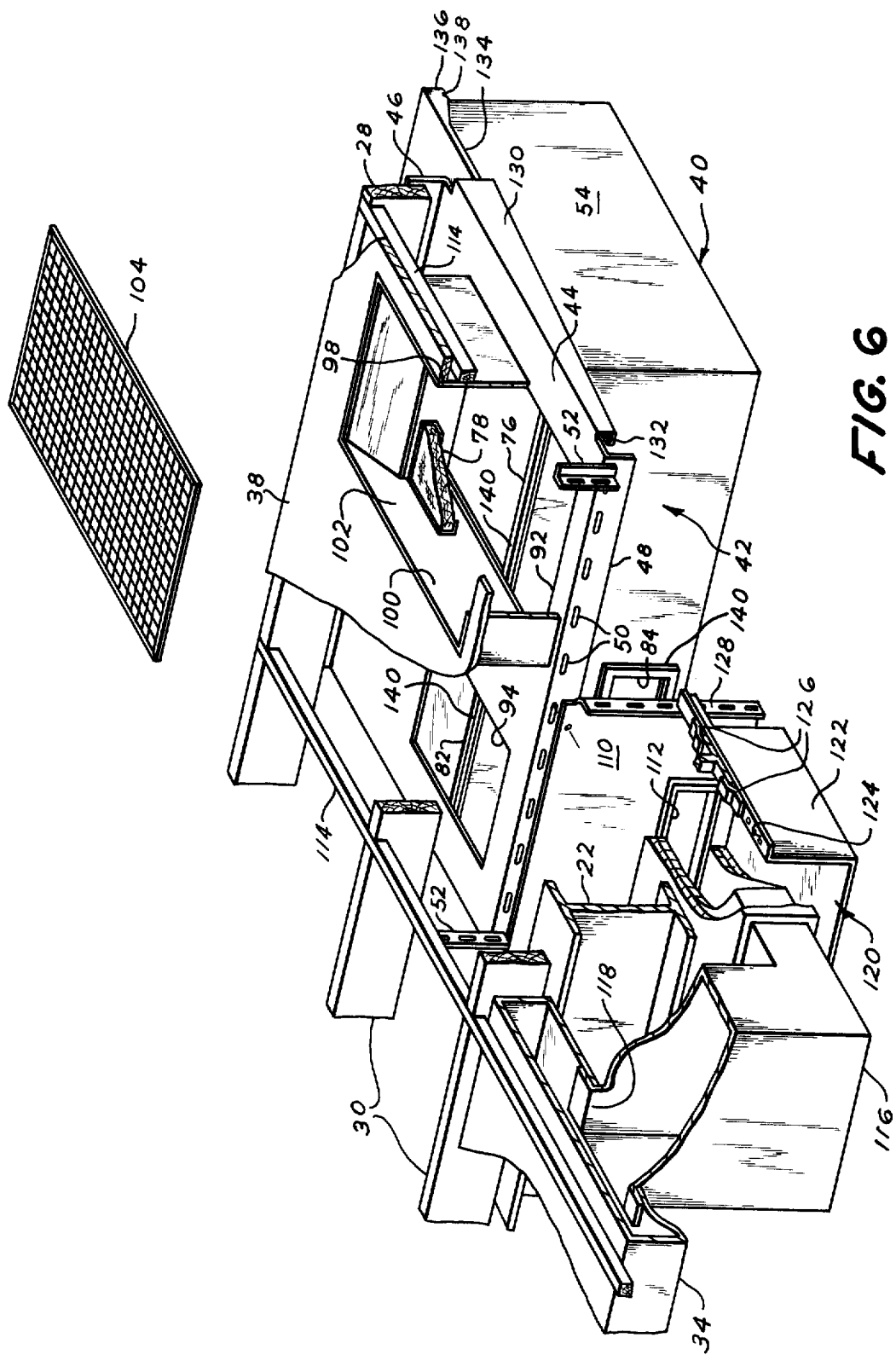
FIG. 6 is an exploded perspective view showing the mobile home base structure of FIG. 4.
Figure 8:
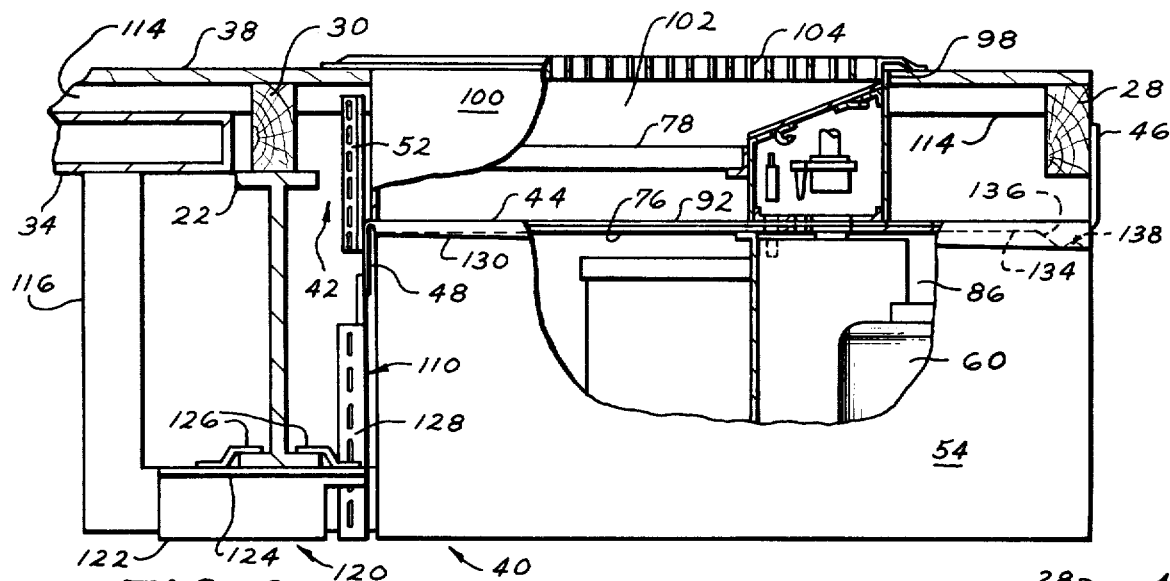
FIG. 8 is a sectional elevational view taken along lines 8—8 of FIG. 4 with parts broken away showing the air conditioner in its installed position.

In one type of mobile home construction, the floor section 16 includes floor support members or joists 30, as shown in FIGs. 4, 6 and 8, that are arranged parallel with the support beams 22 and side beam 28 in a spaced relationship across the width of the mobile home. The mobile home is customarily provided with a forced air heating furnace (not shown) which distributes heated air to the various rooms, or zones 32, to be heated through an air distribution system main duct 34. The duct 34 is arranged longitudinally extending usually substantially the full length of the mobile home, and may include air-delivery outlets 36 in each or selected ones of the zones 32 to be heated. In this arrangement, the air distribution system main duct 34 used in conjunction with the heating system of the mobile home 10 is arranged between floor joists 30, that is between the floor 38 of the mobile home and the upper surface of the support member 22 or may be supported below them. In another type of mobile home construction, and more specifically the floor support section 16, as shown in FIGS. 2, 3 and 5, the floor support joists or members 30A are arranged transverse to and are supported on the support member 22. The longitudinally positioned air distribution system duct 34 in this configuration is arranged below the floor joist 30A and in the plane, or between the dimension defined by the upper and lower ends of the support members 22. In either floor section configuration the distribution duct 34 is arranged in the area between the I-beams 22.

In accordance with the present invention, an air conditioning unit 40 (FIGS. 5, 6 and 8) is adapted to be used in conjunction with the mobile home air distribution system duct 34. To this end, aligning and mounting means 42 are provided in either type of floor section 16 construction. The aligning means 42 include a mounting means or adaptor plate 44 secured to the underside of the floor section 16 during the manufacture of the mobile home. The air conditioning unit 40 employed in the present system is capable of circulating conditioned air through the mobile home and is arranged to be removably received in the adaptor plate 44.

The plate 44 is conveniently located in the support area 24, as shown in FIGS. 3 and 4, between members 26 n one or more locations in the mobile home, depending on the size of the mobile home, the number of zones to be conditioned, and the preference of size and capacity of the air conditioning unit.

The back or rear edge of the plate 44 (FIGS. 5 and 6) is provided with an upwardly projecting flange 46 which is secured against the outer side of support beam 28 below wall 12 of the floor section 16. The front or forward edge of the adaptor plate 44 is provided with a downwardly extending flange 48 which includes a series of elongated slots or openings 50. Secured in the slots 50 are angle or support brackets 52 which may have their other ends secured to the floor support joist 30 or 30A. The brackets 52 are similarly provided with a plurality of holes which, together with the slots 50, allow a great degree of vertical and longitudinal flexibility of the forward end of plate 44 with respect to the spacing and dimensions of the joist 30 or 30A.

Figure 7:
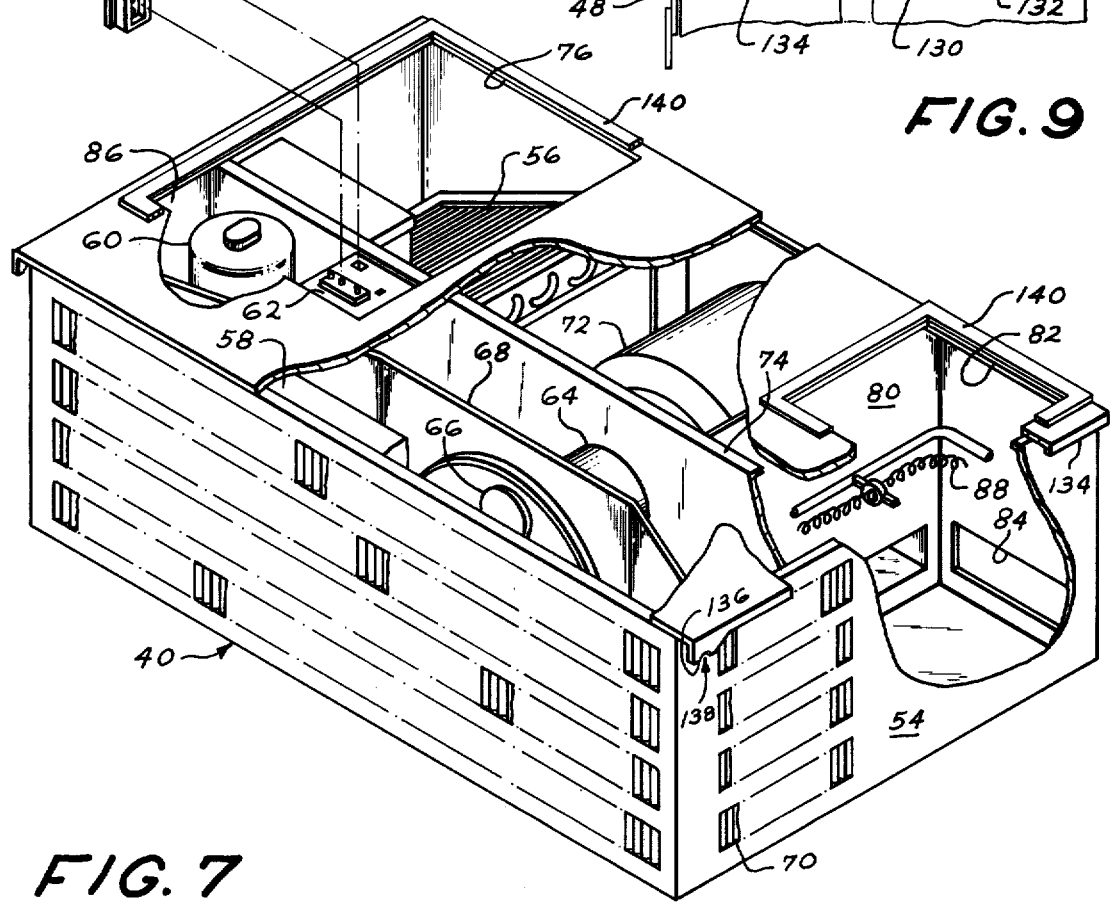
FIG. 7 is a perspective view of the air conditioning unit employed in the present system.

Referring now to FIG. 7, the air conditioning unit 40 to be used in conjunction with the mobile home 10 and its distribution system duct 34 is a self-contained unit arranged in a cabinet 54 and includes the customary refrigeration system having an evaporator section 56, condenser 58, compressor 60, power spply or control section 62, a motor 64 for driving fan 66 arranged in an opening in a barrier 68. The fan 66 moves air in through openings 70 in the side wall of the cabinet 54 and through the condenser 58 on the other side of the barrier 68 and out through louvers arranged in the rear wall of cabinet 54. The motor 64 is of the double-shaft type and also drives a blower 72 arranged in the other side of a barrier 74 which is the main barrier dividing the cabinet 54 into the customary indoor-outdoor sections. The blower 72 draws air through a return inlet 76 arranged in the cover or upper wall of cabinet 54 through an appropriate filter 78 (FIG. 8), evaporator 56, and into a discharge chamber 80 which includes air discharge outlet 82 arranged in the upper wall and an outlet 84 arranged in the forward wall respectively of cabinet 54. The control section 62 and compressor 60 are located in a service area 86 between the barriers 68 and 74. The return inlet 76 as shown in FIG. 7 is dimensioned to extend beyond barrier 74 to provide access to the service area 86. As will be explained hereinafter, the choice of outlets 82, 84 will be based on which type of floor construction 16 the mobile home includes and the mounting means 42.

The air conditioning unit 40 used in conjunction with the present embodiment of the present invention may be of the type that provides both cooling and heating, in which event the mobile home heating furnace may not be installed or used. In order to supply heated air to the mobile home the air conditioning unit may be of the reverse cycle, heat pump type or alternately as shown in FIG. 7 a resistance heater 88 may be arranged in the path of discharge air in the chamber 80. It should be understood that when the air conditioning unit provides both cooling and heating, a heating furnace may not be supplied and the air distrubtion duct 34 may be segmented depending on the number of air conditioning units used and the number or locations of the zones. As will be hereinafter explained in detail, the air conditioning unit 40 is controlled by a temperature responsive thermostat means 90 arranged conveniently in one of the mobile home zones 32.

The aligning means 42 and more specifically the adaptor plate 44, used in the floor section construction shown in FIGS. 2, 3 and 5, are provided with an air-return opening 92 arranged, as will be hereinaftr explained, to communicate with the interior of the mobile homes and an air outlet 94. It will be noted that the opening 92 as will be hereinafter explained in detail, aligns with opening 76 while opening 94 aligns with opening 82 when the air conditioning unit 40 is fully located in the adaptor plate 44. In this embodiment, the air conditioning outlet 84 is not employed and is covered with an appropriate plate or cover 96.

In order for the blower 72 to draw air from the interior of the mobile home, means are provided to connect air-return openings 76 and 92 with an opening 98 in the floor 38 of the mobile home. Accordingly, as seen in FIGS. 5, 6 and 8, the air-return openings 76 and 92 are aligned by a suitable ducting 100 which defines an air-return passageway or opening 102 in the floor section 16. The opening 98 may be provided with an appropriate removably arranged grille 104.

The aligning means 44 also includes air communication means for delivering air from the aligned outlets 82, 94 to the distribution system main duct 34. To this end (FIG. 5), during construction of the mobile home the outlet 94 of plate 44 is connected through an air conduit or passageway means 106 to an opening 108 on the upper wall of the air distribution system main duct 34. It should be noted that in this type of mobile home construction the air conduit 106 is located between transversely arranged floor joists 30A and across the top of support member 22. The duct 100 and conduit 106 like the plate 44 are installed during the construction of the mobile home. As can readily be understood the conduit 106 provides a means for aligning the opening 92 in plate 44 of aligning means 42 and more specifically, the air conditioning air outlet 82 with the distribution system duct 34 so that cooled air from the air conditioner may be delivered through duct 34 into selected zones or zones 32 to be cooled, while the duct 102 provides means for aligning the air conditioner air return inlet 74 with the opening 98 to complete the recirculation of air through the selected mobile home zone. It should be noted that during construction of the mobile home appropriate removable cover members (not shown) may be arranged over the openings 92 and 94 in plate 44 to prevent leakage of air from the mobile home interior and distribution system duct 34 during normal operation of the heating system in the event an air conditioning unit is not installed. In the event an air conditioning unit is required for the mobile home, the covers may then be removed from openings 92, 94.

The aligning means 42, and more spcifically the adaptor plate 44, employed in the floor construction of the mobile home 10 shown in FIGS. 4, 6 and 8, provides means for connecting the air outlet 84 of the air conditioner unit 40 into communication with the air distribution duct 34. It should be apparent that the longitudinal arrangement of joists 30 in this type of construction precludes the positioning of a conduit for connecting the air conditioning unit with the mobile home air distribution system across the top of the beam 22. Accordingly the air communication means from the air conditioner air delivery outlet to the air distribution system duct 34 is arranged to extend across the bottom of support member 22.

To this end, the aligning means 42 provides a bulkhead or plate 110 which includes an opening 112 secured to the flange 48. The plate 110 extends downwardly so that the opening 112 is located below the lower edge of beam 22. The opening 112 is adjusted into horizontal alignment with opening 84 by positioning the plate 110 in the slots 50 of flange 48. The vertical adjustment to align openings 84, 112 is accomplished by the positioning of brackets 52 relative to the cross members 114 secured to the joist 30.

Further, in this type mobile home construction, communication between the air conditioning unit 40 and duct 34 is effected by an air conduit means 116. The conduit 116 extends from the opening 112 across the bottom edge of beam 22 and then upwardly to an opening 118 in the mobile home air distribution duct 34. Alternatively the opening 84 may be located in the side wall of cabinet 54 and the plate 110 arranged adjacent the side wall with duct 116 extending across the bottom of beam 22 as hereinbefore described.

Means are provided to support and position the duct 116 on the beam 22 so that duct 116 is axially aligned with opening 112 on the plate 110. Accordingly, the duct 116 rests and is supported on the bottom wall portion of a U-shaped sleeve member 120. The upper ends of the side wall portions 122 of the sleeve 120 are provided with outwardly projecting flanges 124. The sleeve 120 is secured to the beam 22 by a pair of clamps 126 that are secured to each of the flanges 124 and are appropriately shaped to engage the lower oppositely projecting leg portion of the I-beam 22. This clamping arrangement provides longitudinal adjustment along the I-beam 22 while the placement of the clamps 126 in appropriate holes arranged in the flanges 124 provides horizontal axial adjustment relative to opening 112. The sleeve 120 is secured in appropriately selected openings in a vertically arranged flange 128 formed in the plate 110 to support the aligned conduit 116 between the bottom wall of sleeve member 120 and the beam 22. As can readily be understood the conduit 116 provides a means for aligning the opening 112 in plate 110 of the aligning means 42 and more specifically the air conditioning air outlet 84 with the distribution system duct 34.

In accordance with the present invention means are provided to properly locate the air conditioning unit relative to the adaptor plate 44 and more particularly to insure the alignment of the adaptor plate opening 92 with an air conditioner inlet 76 and outlet 82 with opening 94 or alternatively outlet 84 with opening 112 so that conditioned air is effectively delivered from the air conditioner to the distribution duct 34 and return air is drawn from mobile home interior to complete the recirculation process.

To this end the mounting means (FIGS. 5, 6 and 8) and more specifically the adaptor plate 44 is provided with track or support members 130 projecting downwardly along the parallel edge portion between flanges 46 and 48. The support members 130 are bent inwardly at their lower edge to provide raceways 132 along substantially their entire length. The raceways 132 are arranged to incline upwardly from the rear or flange 46 end of plate 44 toward flange 48.

The air conditioning unit 40 is provided with guide members 134 arranged along the upper edge portion of the side walls of cabinet 54. The guide members 134 are provided with downwardly projecting cam elements 136 at their rear or trailing edge portion.

In operation, that is during the insertion of the air conditioning unit 40 guide members 134 into the raceways 132 of the support members 130, the leading or forward edge of the guide members 134 ride upwardly in the raceways 132 toward the underside of adaptor plate 44 until cam elements 136 engage the lower or rear open open end of the support member 130 just prior to the complete insertion operation as shown in FIGS. 5 and 6. During the last portion of the insertion operation, the cam member 136 rides up into the raceway 132 causing the rear or trailing end of the air conditioner 40 to be raised as it is completely inserted and positioned in the support member 130 so that the top wall of the cabinet 54 is parallel to and in intimate contact with the surface of the adaptor plate 44, with the appropriate openings therein engaged in a sealed air transfer position with the complimentary air conditioning unit outlets. It will be understood that due to the angle of the support member 130, when cam 136 makes its initial contact with raceway 132 the forward end of the air conditioning cabinet is positioned substantially adjacent the plate 44 and the final lifting action of cam 136 on the rear end of portion of cabinet 54 has a closing effect between the cooperating surfaces of plate 44 and cabinet 54.

To maintain cabinet 54 in its completely inserted position in the plate 44 appropriate detent or indexing means 138 is provided that counteracts between support member 130 and guide member 134.

To insure that an effective seal is maintained between openings in the mounting means 42 and the cooperating outlets in the air conditioner appropriate resilient gasket means 140 is arranged around the periphery of inlet 76 and outlets 82, 84. It should be noted however that the same effective seal between the mounting means 42 openings and the air conditioner inlets and outlets may be attained by locating the gaskets on the mounting means.

Figure 9:
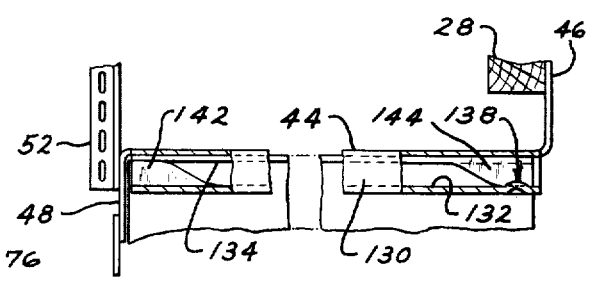
FIG. 9 is a fragmentary view showing another embodiment of the invention.

Referring now to FIG. 9 another embodiment of the cam arrangement is shown wherein complimentary cam means are arranged in both the guide member 134 and the support member 130, with the raceway 132 being substantially level with respect to plate 44. Accordingly a cam member 142 is formed on the forward end portion of the support member 130 with a second cam 144 being formed on the rear end portion of guide member 134. In operation the air conditioner 40 remains substantially parallel to the adaptor plate 44 during its initial insertion or until the leading edge of member 134 contacts cam 142, and cam 144 contacts the open end of raceway 132. The continued insertion after cam contact is made causes both cams to effectively raise the air conditioner 40 in a continued substantially parallel mode until intimate contact is made with plate 44.

In summary it should be apparent from the foregoing description that an air conditioning system is provided for air conditioning a mobile home that includes installing a mounting means during construction of the mobile home for adapting the mobile home to removably receive a self-contained air conditioning unit. The mounting means includes air communication means for connecting the air conditioner in air communication with the distribution system duct of the mobile home. Guide members on the air conditioning unit are received in suitable support members on the mounting means for removably receiving the air conditioning unit. Cam means interacting between the guide and support members are effective in properly locating the air conditioning air delivery outlet and inlet with the air communication means.

While there has been shown and described a specific embodiment of the invention, it will be understood that it is not limited thereto and it is intended by the appended claims to cover all such modifications as fall within the true spirit and scope of the invention.

What is claimed is:

1. An air conditioning system including a mobile home having at least one zone to be air conditioned and a base structure, air distribution means associated with said base structure, said system comprising:

an air conditioning unit including a cabinet having air moving means, air delivery and air return outlets, and being adapted to be removably attached to said mobile home;

said air distribution means including at least one air inlet for receiving air from said air conditioning unit and air outlet for delivering air into said mobile home zone;

mounting means attached to said base structure for removably receiving said air conditioning unit including a first and second opening;

air communicating means including a first passageway connecting said first opening and with said air distribution means for delivering air into said mobile home and a second passageway for connecting said second opening with said mobile home interior so that said air moving means recirculates air through said mobile home;

guide members arranged along the side walls of said air conditioner cabinet;

support members on said mounting means adapted to receive said guide members for removably supporting said air conditioning unit; and means associated with and interacting between said members for lifting said air conditioning unit into initimate position with said mounting means and for positioning said air conditioner so that said air conditioning unit's air delivery and air return outlets are aligned with said first and second openings respectively in said mounting means during the insertion of said guide members into said support members.

2. The air conditioning system according to claim 1 wherein said support member is inclined so that said leading end of said guide member and air conditioner is raised during its insertion into said support member; and cam means being arranged on the trailing end of said guide member engages said support member to raise the trailing end of said guide means and air conditioner upon the continued insertion of said air conditioner unit guide member in said mounting means support member.

3. The air conditioning system according to claim 1 wherein cam means arranged on said support member being arranged to engage the leading edge of said guide member, and cam means on the trailing end of said guide member being arranged to engage said support member for lifting said air conditioner into intimate engagement wth said mounting means.

4. The air conditioning system according to claim 1 wherein resilient gasket means are arranged to be engaged between said mounting means and said air conditioner cabinet when said cabinet is positioned in said adaptor plate for forming a seal between said air conditioner outlets and said mounting means openings.

5. An air conditioner for use in a mobile home including at least one zone to be air conditioned, a base structure, an air distribution means associated with said base structure having an air outlet positioned in said zone, mounting means attached to said base structure for removably receiving said air conditioning unit, air communicating means including a first passageway communicating between a first opening in said mounting means and said air distribution means, a second passageway between a second opening in said mounting means and the interior of said mobile home, said air conditioner comprising:
 a cabinet having an air conditioning unit including an air inlet opening and an air delivery opening, and air moving means for moving air from said inlet opening and out said air delivery opening;
 guide members arranged along the side walls of said air conditioner cabinet;
 support members on said mounting means adapted to receive said guide members for removably supporting said air conditioning unit; and
 means associated with and interacting between said members for lifting said air conditioning unit into intimate position with said adaptor plate and for positioning said air conditioner so that said air conditioning unit's air delivery and air return outlets are aligned with said first and second openings respectively in said adaptor plate during the insertion of said guide members into said support members.

6. The air conditioning system according to claim 5 wherein said support member is inclined so that said leading end of said guide member and air conditioner is raised during its insertion into said support member; and
 cam means being arranged on the trailing end of said guide member engages said support member to raise the trailing end of said guide means and air conditioner upon the continued insertion of said air conditioner unit guide member in said mounting means support member.

7. The air conditioning system according to claim 5 wherein cam means arranged on said support member being arranged to engage the leading edge of said guide member, and cam means on the trailing end of said guide member being arranged to engage said support member for lifting said air conditioner into intimate engagement with said mounting means.

8. The air conditioning system according to claim 5 wherein resilient gasket means are arranged to be engaged between said mounting means and said air conditioner cabinet when said cabinet is positioned in said adaptor plate for forming a seal between said air conditioner outlets and said mounting means openings.

* * * * *